United States Patent
McElfresh et al.

(10) Patent No.: US 7,216,709 B2
(45) Date of Patent: May 15, 2007

(54) HYDRAULIC FRACTURING USING NON-IONIC SURFACTANT GELLING AGENT

(75) Inventors: Paul M. McElfresh, Spring, TX (US); Chad F. Williams, Kingwood, TX (US)

(73) Assignee: Akzo Nobel N.V., Arnhem (NL)

( * ) Notice: Subject to any disclaimer, the term of this patent is extended or adjusted under 35 U.S.C. 154(b) by 226 days.

(21) Appl. No.: 10/975,730

(22) Filed: Oct. 28, 2004

(65) Prior Publication Data
US 2005/0126778 A1 Jun. 16, 2005

Related U.S. Application Data

(63) Continuation-in-part of application No. 09/400,812, filed on Sep. 22, 1999, now abandoned.

(51) Int. Cl.
E21B 43/02 (2006.01)
E21B 21/00 (2006.01)

(52) U.S. Cl. ............ 166/300; 166/283; 166/305.1; 166/308.2; 166/308.3; 172/72; 507/245; 507/265

(58) Field of Classification Search ........... 166/278, 166/282, 283, 300, 305.1, 308.2, 308.3; 175/72; 507/132, 245, 265, 922
See application file for complete search history.

(56) References Cited

U.S. PATENT DOCUMENTS

| 2,748,139 A | 5/1956 | Scudi et al. ............ 260/295.5 |
| 3,306,858 A | 2/1967 | Oberle ..................... 252/99 |
| 3,346,495 A | 10/1967 | Malec et al. ............. 252/49.3 |
| 3,849,348 A | 11/1974 | Hewitt ..................... 252/547 |
| 4,077,990 A | 3/1978 | Prodo et al. ............. 260/404.5 |
| 4,108,782 A | 8/1978 | Thompson ............... 252/8.55 |
| 4,113,631 A | 9/1978 | Thompson ............... 252/8.55 |
| 4,553,601 A | 11/1985 | Almond et al. ........... 166/308 |
| 4,554,082 A | 11/1985 | Holtmyer et al. ....... 252/8.55 R |
| 4,654,158 A | 3/1987 | Shepherd, Jr. ............... 252/91 |
| 4,735,731 A | 4/1988 | Rose et al. ................ 252/8.51 |
| 4,737,296 A | 4/1988 | Watkins .................. 252/8.553 |
| 4,745,976 A | 5/1988 | Harwell et al. ........... 166/273 |
| 4,806,256 A | 2/1989 | Rose et al. ................... 252/71 |

(Continued)

FOREIGN PATENT DOCUMENTS

EP 0070076 B2 1/1983

(Continued)

OTHER PUBLICATIONS

"Hawley's Condensed Chemical Dictionary," Revised by N. Irving Sax and Richard J. Lewis, Sr., Eleventh Edition Oct. 4, 1989, p. 1118.

(Continued)

Primary Examiner—George Suchfield
(74) Attorney, Agent, or Firm—Ralph J. Mancini

(57) ABSTRACT

The present invention generally relates to a method for treating a subterranean formation with an aqueous viscoelastic treating fluid that an aqueous base fluid and one or more non-ionic amido amine oxide surfactant gelling agents. The treatment method comprises injecting the aqueous viscoelastic surfactant treating fluid through a wellbore and into the subterranean formation under conditions effective to control fluid loss, and breaking the gel of the aqueous viscoelastic treating fluid subsequent to treating said formation.

9 Claims, 2 Drawing Sheets

U.S. PATENT DOCUMENTS

| | | | | |
|---|---|---|---|---|
| 4,856,588 A | 8/1989 | Borchardt | ................... | 166/273 |
| 5,061,386 A | 10/1991 | Muijs et al. | ............. | 252/8.551 |
| 5,080,171 A | 1/1992 | Wolf et al. | ................. | 166/300 |
| 5,101,903 A | 4/1992 | Llave et al. | ................ | 166/294 |
| 5,149,463 A | 9/1992 | Peterson | ................ | 252/301.21 |
| 5,246,698 A | 9/1993 | Leshchiner et al. | ...... | 424/78.08 |
| 5,310,002 A | 5/1994 | Blauch et al. | ............ | 166/307 |
| 5,462,689 A | 10/1995 | Choy et al. | ................... | 252/90 |
| 5,551,516 A | 9/1996 | Norman et al. | ............. | 166/308 |
| 5,807,810 A | 9/1998 | Blezard et al. | ............. | 456/414 |
| 5,946,295 A | 8/1999 | Sofman et al. | ............. | 370/228 |
| 5,964,295 A | 10/1999 | Brown et al. | ............... | 166/308 |
| 5,979,557 A | 11/1999 | Card et al. | .................. | 166/300 |
| 6,035,936 A | 3/2000 | Whalen | ....................... | 166/308 |
| 6,239,183 B1 | 5/2001 | Farmer et al. | ............. | 516/102 |
| 6,506,710 B1 | 1/2003 | Hoey et al. | ................ | 507/242 |
| 7,052,901 B2 * | 5/2006 | Crews | ........................ | 435/281 |
| 2002/0014714 A1 | 2/2002 | Yoshida et al. | ............. | 264/138 |
| 2005/0137095 A1* | 6/2005 | Cawiezel et al. | ........... | 507/240 |
| 2005/0252658 A1* | 11/2005 | Willingham et al. | ........ | 166/279 |

FOREIGN PATENT DOCUMENTS

| | | |
|---|---|---|
| EP | 0474284 A1 | 3/1992 |
| GB | 1212782 | 11/1970 |
| GB | 1404335 | 8/1975 |
| GB | 2018863 A | 10/1979 |
| GB | 2119358 A | 11/1983 |
| JP | 5093181 | 4/1993 |
| JP | 9003491 | 1/1997 |
| JP | 10197306 | 7/1998 |
| WO | WO 94/17154 | 8/1994 |
| WO | WO 97/33960 | 9/1997 |
| WO | WO 99/32572 | 7/1999 |

OTHER PUBLICATIONS

Derwent/WPI Abstract JP 5093181 Publication Date Apr. 16, 1993.
Derwent/WPI Abstract JP 9003491 Publication Date Jan. 7, 1997.
Derwent/WPI Abstract JP 10197306 Publication Date Jul. 31, 1998.
Derwent/WPI Abstract WO 97/33960 Publication Date Sep. 18, 1997.

* cited by examiner

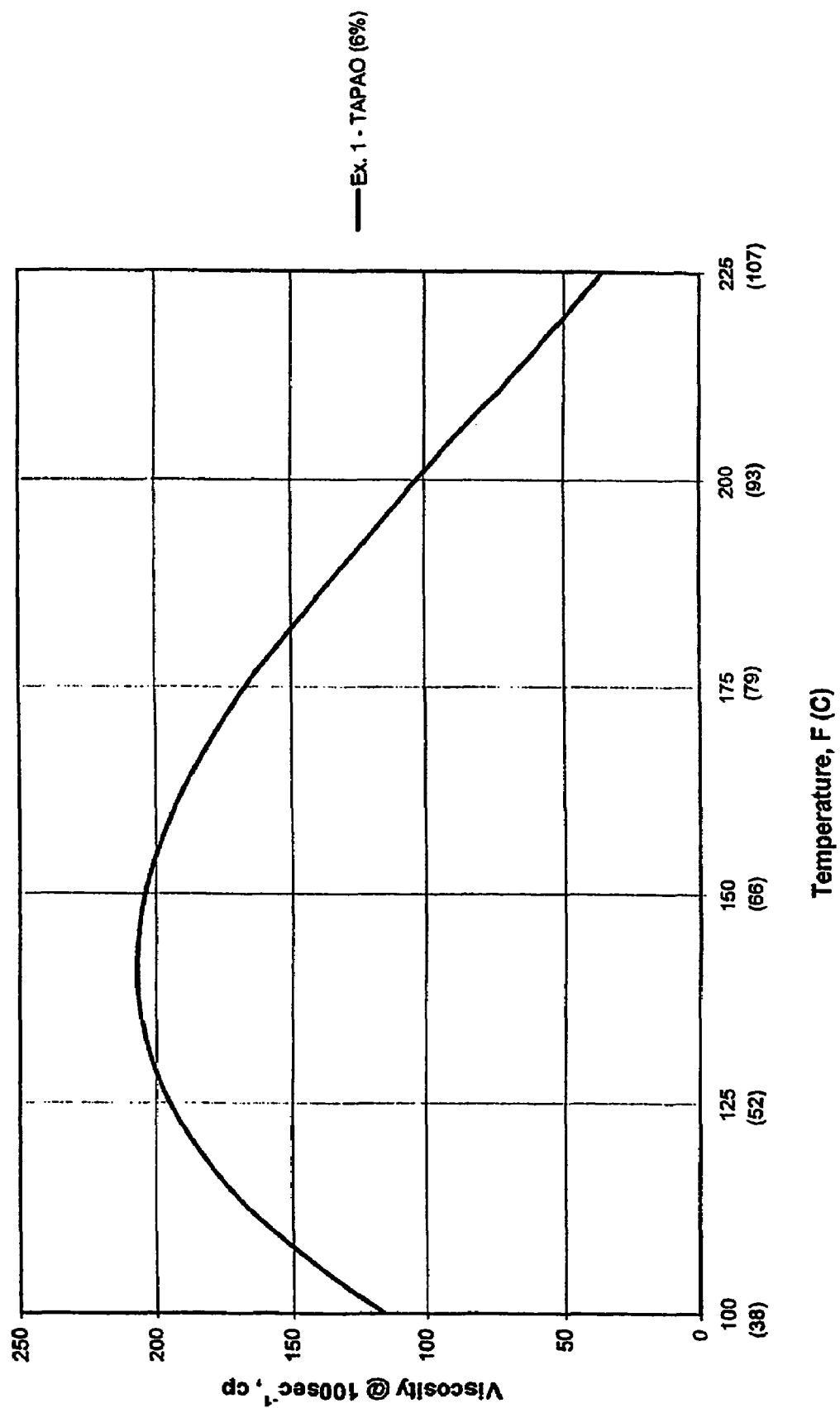

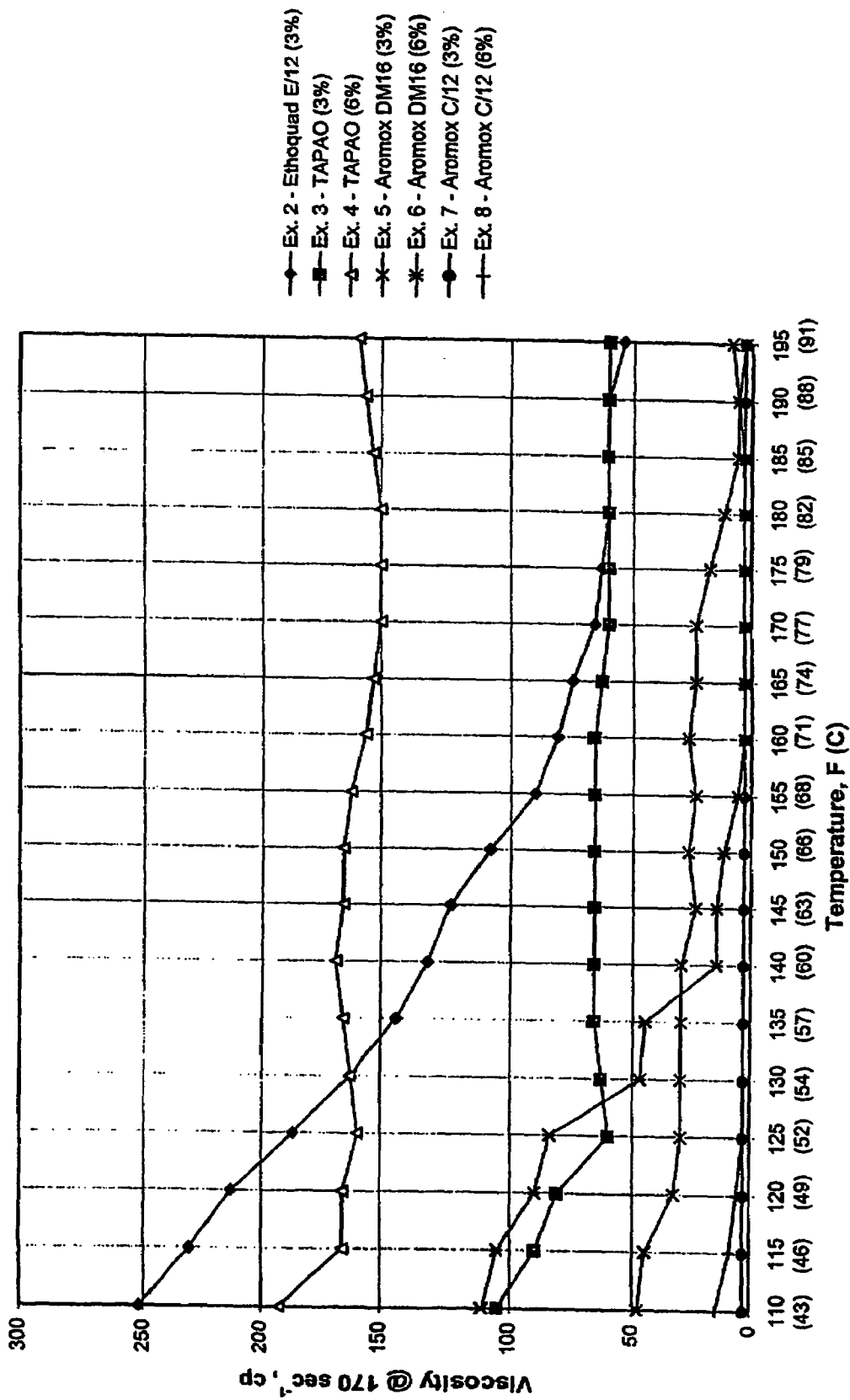

HYDRAULIC FRACTURING USING NON-IONIC SURFACTANT GELLING AGENT

This is a continuation-in-part of U.S. patent application Ser. No. 09/400,812 filed on Sep. 22, 1999, now abandoned.

FIELD OF THE INVENTION

The present invention relates to treatment fluids used during petroleum recovery operations, and more particularly relates, in one embodiment, to methods of using treatment fluids containing gelling agents during petroleum recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have-been developed, but most commercially used fracturing fluids are aqueous based liquids which have either been gelled or foamed. When the fluids are gelled, typically a polymeric gelling agent, such as a solvatable polysaccharide is used. The thickened or gelled fluid helps keep the proppants within the fluid.

While polymers have been used in the past as gelling agents in fracturing fluids to carry or suspend solid particles in the brine, such polymers require separate breaker compositions to be injected to reduce the viscosity. Further, such polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage.

Conventional polymers are also either cationic or anionic which present the disadvantage of likely damage to the producing formations.

It would be desirable if a composition and method could be devised to overcome some of the problems in the conventional injection of treatment fluids such as fracturing fluids.

SUMMARY OF THE INVENTION

Accordingly, it is an object of the present invention to provide a non-polymer, non-ionic gelling agent for aqueous treatment fluids used in hydrocarbon recovery operations.

It is another object of the present invention to provide a gelling agent which may have improved viscosity breaking, higher sand transport capability, is more easily recovered after treatment, and has low potential for damaging the reservoir.

Still another object of the invention is to provide a gelling agent method which can be more easily mixed "on the fly" in field operations and does not require numerous co-additives in the fluid system.

In carrying out these and other objects of the invention, there is provided, in one form, a method for treating a subterranean formation which involves first providing an aqueous viscoelastic treating fluid having an aqueous base fluid and a non-ionic amine oxide surfactant gelling agent. The aqueous viscoelastic treating fluid is then injected through a wellbore and into the subterranean formation, and the subterranean formation is treated under conditions effective to do so.

BRIEF DESCRIPTION OF THE DRAWINGS

FIG. 1 is a graph of surfactant gel viscosity as a function of temperature; and

FIG. 2 is an additional graph of surfactant gel viscosity plotted as a function of temperature comparing an inventive amine oxide gelling agent with conventional gelling agents.

DETAILED DESCRIPTION OF THE INVENTION

A new type of gelling agent has been discovered which will improve the fracturing (frac) fluid performance through the use of a polymer-free system. This system offers improved viscosity breaking, higher sand transport capability, is more easily recovered after treatment, and is relatively non-damaging to the reservoir. The system is also more easily mixed "on the fly" in field operations and does not require numerous co-additives in the fluid system, as do some prior systems. The new inventive system is non-ionic, while other fluids of this type are either cationic or anionic, which is an advantage over prior systems. Non-ionic fluids are inherently less damaging to the producing formations than cationic fluid types, and are more efficacious per pound than anionic gelling agents. The amine oxide technology of this invention has the potential to offer more gelling power per pound, making it less expensive than other fluids of this type.

The amine oxide gelling agents of the invention have the following structure (I):

where R is an alkyl or alkylamido group averaging from about 8 to 27 carbon atoms and each R' is independently H, or an alkyl group averaging from about 1 to 6 carbon atoms. Preferably, R is an alkyl or alkylamido group averaging from about 8 to 16 carbon atoms and R' are independently alkyl groups averaging from about 2 to 3 carbon atoms. A particularly preferred amine oxide gelling agent is tallow amido propylamine oxide (TAPAO), which should be understood as a dipropylamine oxide since both R' groups are propyl.

The amine oxide gelling agents of the invention may be used in any aqueous treatment fluids, particularly brines.

The brine base fluid may be any brine, conventional or to be developed which serves as a suitable media for the various concentrate components. As a matter of convenience, the brine base fluid may be the brine available at the site used in the completion fluid, for a non-limiting example.

While the amine oxide gelling agents of the invention are described most specifically herein as having use in fracturing fluids, it is expected that they will find utility in acidizing fluids, gravel pack fluids, stimulation fluids and the like. Of course, when the treatment fluid is a fracturing fluid, the fluid also contains at least an effective amount of a proppant to prop open the fractures, and the fluid is injected into the formation under sufficient and effective hydraulic pressure and pump rate to fracture the formation. When the treatment fluid is an acidizing fluid, it further contains an effective amount of an acid, either inorganic or organic, of sufficient strength to acidize the formation. When the amine oxide gelling agents are used in gravel packing fluid, the gelling agent helps contain an effective amount of the gravel within the fluid. If the amine oxide gelling agents are used in another well stimulation fluid, an effective amount of any additional stimulating agent is employed. When the amine oxide gelling agents are used in a fluid loss control application, an effective amount of a salt or easily removed solid is employed, and the amine oxide gelling agents help suspend the salts or solids in the fluid. These other components of the treatment fluids are well known in the art.

The effective proportion of the amine oxide gelling agents in the treatment fluids of this invention range from about 0.5 to about 25 vol. %, preferably from about 1 to about 10 vol. %, and most preferably about 6 vol. %. In a non-limiting example, a 6 vol. % solution of the gelling agent is mixed with brine, which is then blended with sand or other particulate, and pumped into a hydrocarbon bearing reservoir.

In one non-limiting embodiment of the invention, the non-ionic amine oxide gelling agents are the only gelling agents employed, although more than one may be used. In another non-limiting embodiment of the invention, the non-ionic amine oxide gelling agents are employed in the absence of polymeric gelling agents. In still another non-limiting embodiment of the invention, the non-ionic amine oxide gelling agents are employed in the absence of either cationic or anionic gelling agents.

In the method of this invention, breaking the gel of the aqueous viscoelastic treating fluid made using the amine oxides of this invention may be accomplished by a variety of mechanisms. These may include, but are not necessarily limited to, contacting the fluid with a hydrocarbon, contacting the fluid with alkoxylated alcohol solvents, dilution, such as with larger quantities of brine or water, or the addition of a reactive agent. The hydrocarbon may be the hydrocarbon produced from the formation or other hydrocarbon.

In another embodiment of the invention, the treatment fluid may contain viscosifying agents; other surfactants, clay stabilization additives, scale dissolvers, biopolymer degradation additives, and other common components.

The proppant, solid particle or gravel may be any solid particulate matter suitable for its intended purpose, for example as a screen or proppant, etc. Suitable materials include, but are not necessarily limited to sand, sintered bauxite, sized calcium carbonate, sized salts, ceramic beads, and the like, and combinations thereof. These solids may also be used in a fluid loss control application.

A basic method is to inject the proppant into a carrier fluid or treatment brine downstream from the conventional pumps which are delivering the gravel packing fluid, e.g. to do this, the proppant is suspended in the viscosified brine. The proppant may thus be delivered by a small injection pump to the carrier fluid at an injection point downstream from the pumps used to transport the gravel packing fluid or other treatment fluid.

The invention will be further described with respect to the following Examples which are not meant to limit the invention, but rather to further illustrate it.

EXAMPLE 1

The following fluid was prepared in 3% KCl brine: 6 vol. % TAPAO. The surfactant gel viscosity of the fluids were measured on a Brookfield PVS viscometer at 100 sec-I. The results are plotted on the chart of FIG. 1. It was surprisingly discovered that the viscosity of the fluids using the inventive gelling agents herein remains generally stable over the tested temperature range. It was also surprisingly discovered that the viscosity of the fluids using the inventive gelling agents herein remains generally,stable over time as well. Five (5) hours was a typical test period for these tests.

EXAMPLES 2–8

The following fluids were prepared in 3% KCl brine:
Comparative Example 2:3 vol. % ETHOQUAD E/12.
Example 3:3 vol. % TAPAO of a 50 vol. % solution.
Example 4:6 vol. % TAP AO of a 50 vol. % solution.
Comparative Example 5:3 vol. % AROMOX DM16
Comparative Example 6:6 vol. % AROMOX DM16
Comparative Example 7:3 vol. % AROMOX C/12
Comparative Example 8:6 vol. % AROMOX C/12

The AROMOX materials are polymeric quaternary ammonium halide salt gelling agents commercially available from Akzo-Nobel, Inc. AROMOX DM16 is a polymeric quaternary ammonium halide salt gelling agent have a $C_{16}$ substituent and two $C_1$ substituents on the nitrogen. AROMOX C/12 is a polymeric quaternary ammonium halide salt gelling agent have a $C_{12}$ substituent and two $C_1$ substituents on the nitrogen.

ETHOQUAD E/12 is an ethoxylated quaternary ammonium salt available from Akzo Nobel Surface Chemistry LLC, Chicago, Ill.

The surfactant gel viscosity of the fluids was measured on a Fann 35 viscometer at 170 $sec^{-1}$. The results are plotted on the chart of FIG. 2. It can be seen again that the fluid of comparative Example 2 using ETHOQUAD E/12 loses viscosity as the temperature increases. It was again shown that the viscosity of the fluids using the inventive gelling agents herein remains generally stable over the tested temperature range. The viscosity of tile fluids using the inventive gelling agents herein (Examples 3 and 4) was also higher and more stable than the comparative Examples 5–8 using commercially available AROMOX materials.

AROMOX E/12 and SO/50 mixtures of AROMOX C/12 with AROMOX E/12 at both 3 vol. % and 6 vol. % were also tested, but gave generally lower viscosities than AROMOX 16 at 3 vol. %.

The inventive non-ionic, non-polymeric amine oxide gelling agents of this invention provide gelling stability over a wide temperature range and at relatively high temperatures. They are also expected to be relatively non-damaging to the formation since they are non-ionic.

In the foregoing specification, the invention has been described with reference to specific embodiments thereof, and has been demonstrated as effective in providing a treatment fluid with stable surfactant gel viscosity. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, amine oxides and other components falling within the claimed parameters, but not specifically identified or tried in a particular composition, are anticipated to be within the scope of this invention.

We claim:

1. A method for controlling fluid loss in a subterranean formation comprising:
   providing an aqueous viscoelastic treating fluid having:
      an aqueous base fluid; and
      one or more non-ionic amido amine oxide surfactant gelling agents having the formula:

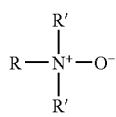

where R is an alkylamido group averaging from about 8 to 27 carbon atoms and R' are independently hydrogen or alkyl groups averaging from about 1 to 3 carbon atoms as the only gelling agents employed; where the viscoelastic treating fluid further comprises a salt or easily removed solid or mixtures thereof;
   wherein said treatment comprises
      injecting the aqueous viscoelastic surfactant treating fluid through a wellbore and into the subterranean formation under conditions effective to form a gel thereby controlling fluid loss, and
      breaking the gel of the aqueous viscoelastic treating fluid subsequent to treating said formation.

2. The method of claim 1 where the non-ionic amido amine oxide surfactant gelling agent is employed is present in the aqueous base fluid in a proportion from about 0.5 to about 25 vol. %.

3. The method of claim 1 where the non-ionic amido amine oxide surfactant gelling agent is tallow amido propylamine oxide (TAPAO).

4. The method of claim 1 where the aqueous base fluid is brine.

5. The method of claim 1 wherein the breaking of the gel of the aqueous viscoelastic treating fluid is accomplished by a mechanism selected from the group consisting of contact with a hydrocarbon, contact with alkoxylated alcohol solvents, dilution, and contact with at least one reactive agent.

6. A method for controlling the fluid loss in a subterranean formation which comprises treating said formation with a viscoelastic treating fluid which comprises:
   an aqueous base fluid; and
   a gelling agent that comprises a non-ionic amido amine oxide, wherein said amido amine oxide is tallow amido propylamine oxide (TAPAO);
   wherein said viscoelastic treating fluid further comprises a salt or solid, or and mixtures thereof;
   wherein said treatment comprises
      injecting the aqueous viscoelastic surfactant treating fluid through a wellbore and into the subterranean formation under conditions effective to form a gel thereby controlling fluid loss, and
      breaking the gel of the aqueous viscoelastic treating fluid subsequent to treating said formation.

7. The method of claim 6 where the non-ionic amido amine oxide surfactant gelling agent is employed is present in the aqueous base fluid in a proportion from about 0.5 to about 25 vol. %.

8. The method of claim 6 where the aqueous base fluid is brine.

9. The method of claim 6 wherein the breaking of the gel of the aqueous viscoelastic treating fluid is accomplished by a mechanism selected from the group consisting of contact with a hydrocarbon, contact with alkoxylated alcohol solvents, dilution, and contact with at least one reactive agent.

* * * * *